(No Model.)
O. B. DODGE.
LEATHER AND RUBBER SUBSTITUTE.
No. 601,828. Patented Apr. 5, 1898.
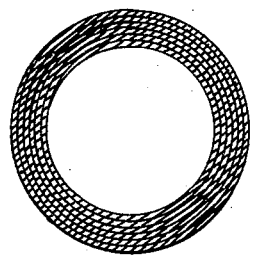
WITNESSES:
A. D. Harrison
P. W. Pezzetti
INVENTOR
Orcales B. Dodge
by Wright, Brown & Quinby
Attys.

UNITED STATES PATENT OFFICE.

ORESTES B. DODGE, OF BOSTON, MASSACHUSETTS, ASSIGNOR OF ONE-HALF TO CHARLES CURTIS, OF NEWTON, MASSACHUSETTS.

LEATHER AND RUBBER SUBSTITUTE.

SPECIFICATION forming part of Letters Patent No. 601,828, dated April 5, 1898.

Application filed July 1, 1897. Serial No. 643,092. (No specimens.)

*To all whom it may concern:*

Be it known that I, ORESTES B. DODGE, of Boston, in the county of Suffolk and State of Massachusetts, have invented certain new and useful Improvements in Leather and Rubber Substitutes, of which the following is a specification.

This invention has for its object to produce a substitute for leather, rubber, and other flexible materials which shall be less expensive and shall possess inherent qualities rendering it more desirable for a variety of purposes, among which may be mentioned use in the manufacture of elastic tires for vehicles, although it is not my intention to limit my invention hereinafter described to use in the manufacture of vehicle-tires alone.

The invention consists in the improved composition of matter and in the improvements in the method of making the same, all of which are hereinafter described and claimed.

The accompanying drawing represents a sectional view of a vehicle-tire made from my improved composition.

In carrying out my invention I take a solution of rubber, such as the ordinary rubber cement, which preferably contains a small proportion of sulfur. After thoroughly mixing the rubber cement and sulfur I add to the mixture a quantity of dry pulverized chalk. I then take chemical wood-pulp, such as ordinary sulfite pulp, and after thoroughly drying the same I beat or otherwise treat it to render it flocculent, so that the fibers will be practically separated from each other and will not adhere to each other in dense masses of any considerable size. With the flocculent fiber I mix a mass of the rubber cement and chalk. The said ingredients are thoroughly mixed, so that the wood fibers are practically enveloped in and saturated by the cement, the flocculence of the fibers enabling the cement to gain access practically to the entire surface of each fiber, it being my intention to avoid an assemblage of fibers lying in contact with each other or without an interposed layer or covering of rubber cement at any part of the mixture. The mixture is then rolled out into a sheet and is subjected to a degree of heat which is lower than that required by the vulcanization of rubber as usually practiced, the preferred degree being about 200° or 225° Fahrenheit. I find that the mixture subjected to heat of about this degree is sufficiently cured to prevent softening of the mixture or of an article made from it by solar heat or its equivalent, this result being due to the presence of the chalk as an ingredient of the mixture. In consequence of the relatively low degree of heat employed the rubber adheres firmly in the completed article to the wood fibers, so that the tensile strength and toughness of the product are not weakened, as would be the case if the mixture were subjected to a vulcanizing temperature of about 300° Fahrenheit, such as that ordinarily employed in connection with rubber articles. I have found that when a mixture of rubber and wood-pulp is used without the chalk the rubber requires such a degree of heat for its proper protection against solarization as to materially weaken the adhesion of the rubber to the wood fibers, the toughness and tensile strength of the composition being correspondingly impaired. This difficulty is entirely avoided by the use of chalk as an ingredient of the mixture. I do not limit myself, however, to the use of chalk, as any like material which may be found to possess the same properties will be within the scope of my invention. The solvent contained in the rubber cement being evaporated, the sheet is left in a somewhat porous and spongy condition and is then subjected to pressure to properly compact and solidify it. This may be accomplished by passing it between rolls or in any other suitable way.

I prefer to add a small proportion of lampblack to the mixture, this ingredient being preferably mixed with the chalk before the latter is mixed with the rubber cement.

The preferred proportions of the various ingredients, by weight, when a substitute for rubber is desired, are as follows: dry chemical wood-pulp, fifty per cent.; rubber cement, twenty-five per cent.; chalk, twenty per cent.; lampblack, two and one-half per cent.; sulfur, two and one-half per cent.

When a substitute for leather is desired, the preferred proportions, by weight, are as follows: dry chemical wood-pulp, sixty per cent.; rubber cement, twenty per cent.;

chalk, fifteen per cent.; lampblack, two and one-half per cent.; sulfur, two and one-half per cent.

A leather substitute made as above set forth is suitable for boots and shoes, valises, upholstery-coverings, and for a variety of other purposes. It is more nearly waterproof than leather, is fully as durable for many purposes, and is much cheaper.

In the drawing I have shown a vehicle-tire composed of this improved composition, the tire being made by rolling a sheet of the composition into a scroll, a suitable adhesive material, such as rubber cement, being interposed between the convolutions to cause them to adhere to each other.

The improved composition is peculiarly adapted for vehicle-tires, owing to the fact that it has a dense tough body which is much less easily punctured than the rubber or combination of rubber and cloth ordinarily used for pneumatic tires. The composition also has advantages over rubber for the manufacture of solid tires, in that its weight is less than that of rubber, while its durability is greater. The expense of making a tire of this composition is considerably less than that of manufacturing a rubber tire.

I claim—

1. The improved method of making a substitute for leather or rubber, consisting in first drying a mass of chemical wood-pulp, then separating the individual dry fibers to bring the mass to a flocculent state, then mixing the flocculent fibers with a mass of rubber cement and pulverized mineral, and then forming the mixture into the shape desired and subjecting it to a degree of heat which is less than that usually employed for vulcanization.

2. The improved method of making a substitute for rubber or leather, consisting in first drying a mass of chemical wood-pulp, secondly separating the individual dry fibers to bring the mass to a flocculent state; thirdly, mixing the flocculent fibers with a mass of rubber cement and a pulverized mineral; fourthly, spreading the mixture into a relatively thick sheet, fifthly, subjecting the sheet to a degree of heat which is less than that usually employed for vulcanization, and lastly, compressing the sheet.

3. A compacted sheet of material consisting of chemical wood fibers uniformly mixed with and enveloped in a firmly-adherent mass of cured rubber and pulverized mineral.

4. As an article of manufacture, a vehicle-tire composed of compacted material, said material consisting of chemical wood fibers uniformally mixed with and enveloped in a firmly-adherent mass of cured rubber and pulverized mineral.

In testimony whereof I have signed my name to this specification, in the presence of two subscribing witnesses, this 19th day of June, A. D. 1897.

ORESTES B. DODGE.

Witnesses:
C. F. BROWN,
A. D. HARRISON.